United States Patent
Jiao et al.

(10) Patent No.: US 10,410,454 B2
(45) Date of Patent: Sep. 10, 2019

(54) IMAGE SENSOR AND BANKNOTE PROCESSING APPARATUS

(71) Applicant: SHANDONG NEW BEIYANG INFORMATION TECHNOLOGY CO., LTD., Shandong (CN)

(72) Inventors: Peng Jiao, Shandong (CN); Bingqing Liu, Shandong (CN); Jigang Zhang, Shandong (CN); Lingang Li, Shandong (CN)

(73) Assignee: SHANDONG NEW BEIYANG INFORMATION TECHNOLOGY CO., LTD. (CN)

( * ) Notice: Subject to any disclaimer, the term of this patent is extended or adjusted under 35 U.S.C. 154(b) by 0 days.

(21) Appl. No.: 15/557,150

(22) PCT Filed: Feb. 19, 2016

(86) PCT No.: PCT/CN2016/074137
§ 371 (c)(1),
(2) Date: Sep. 11, 2017

(87) PCT Pub. No.: WO2016/141801
PCT Pub. Date: Sep. 15, 2016

(65) Prior Publication Data
US 2018/0068512 A1 Mar. 8, 2018

(30) Foreign Application Priority Data
Mar. 11, 2015 (CN) .......................... 2015 1 0106194

(51) Int. Cl.
*G07D 7/1205* (2016.01)
*G07D 11/16* (2019.01)
(Continued)

(52) U.S. Cl.
CPC ............ *G07D 7/1205* (2017.05); *G07D 7/12* (2013.01); *G07D 7/17* (2017.05); *G07D 7/189* (2017.05);
(Continued)

(58) Field of Classification Search
CPC ................................................ G07D 7/1205
See application file for complete search history.

(56) References Cited

U.S. PATENT DOCUMENTS

| | | | | |
|---|---|---|---|---|
| 4,525,630 A | * | 6/1985 | Chapman | G07D 7/12 250/227.29 |
| 4,723,072 A | * | 2/1988 | Naruse | G07D 7/12 209/534 |

(Continued)

FOREIGN PATENT DOCUMENTS

| | | |
|---|---|---|
| CN | 101499188 A | 8/2009 |
| CN | 101605199 A | 12/2009 |

(Continued)

OTHER PUBLICATIONS

Patent Cooperation Treaty (PCT), International Search Report and Written Opinion for Application PCT/CN2016/074137 filed Feb. 19, 2016, dated May 16, 2016, International Searching Authority, CN.

*Primary Examiner* — Ping Y Hsieh
*Assistant Examiner* — Jose Torres
(74) *Attorney, Agent, or Firm* — McDonald Hopkins LLC (57) ABSTRACT

An image sensor and a banknote processing apparatus are provided. The image sensor includes a first photosensitive assembly and a first light source assembly which is configured to irradiate light to an original, and further includes a first lens array configured to aggregate light reflected by the original to the first photosensitive assembly, and a light-entering surface of the first lens array is located in a transmission path of reflected light generated due to specular (Continued)

reflection occurred when light emitted from the first light source assembly irradiates on the original. According to different image grayscale values generated by the image sensor, the banknote processing apparatus judges whether a banknote surface is stuck to an adhesive tape.

1 Claim, 6 Drawing Sheets

(51) Int. Cl.
*G07D 7/12* (2016.01)
*H04N 1/028* (2006.01)
*G07D 7/17* (2016.01)
*G07D 7/202* (2016.01)
*G07D 7/189* (2016.01)

(52) U.S. Cl.
CPC .............. *G07D 7/205* (2013.01); *G07D 11/16* (2019.01); *H04N 1/028* (2013.01)

(56) References Cited

U.S. PATENT DOCUMENTS

| | | | | |
|---|---|---|---|---|
| 5,308,992 | A * | 5/1994 | Crane | G06K 7/081 |
| | | | | 250/556 |
| 6,797,974 | B2 * | 9/2004 | Philipp | G07D 7/121 |
| | | | | 250/556 |
| 2005/0083392 | A1 * | 4/2005 | Silverbrook | B41J 2/14427 |
| | | | | 347/108 |
| 2008/0273789 | A1 * | 11/2008 | Bell | G07D 7/17 |
| | | | | 382/137 |
| 2010/0277748 | A1 * | 11/2010 | Potapenko | G01B 11/026 |
| | | | | 356/623 |
| 2016/0063792 | A1 * | 3/2016 | Luo | G07D 11/0012 |
| | | | | 271/3.12 |

FOREIGN PATENT DOCUMENTS

| | | |
|---|---|---|
| CN | 103685833 A | 3/2014 |
| CN | 103929561 A | 7/2014 |
| CN | 204440529 A | 7/2015 |
| WO | 2011013935 A2 | 2/2011 |

* cited by examiner

IMAGE SENSOR AND BANKNOTE PROCESSING APPARATUS

CROSS-REFERENCE TO RELATED APPLICATION

This application is a 35 U.S.C. 371 national stage filing of PCT Application No. PCT/CN2016/074137 filed on Feb. 19, 2016, which claims priority to Chinese Patent Application No. 201510106194.8 filed on Mar. 11, 2015, each of which are incorporated herein in their entirety by reference.

TECHNICAL FIELD

The present disclosure relates to an image sensor and a banknote processing apparatus.

BACKGROUND

Banks and other financial institutions require a banknote recognizer, a sorter and other banknote processing apparatuses to detect whether a banknote surface is stuck to a transparent adhesive tape, so as to prevent criminals from sticking some genuine banknotes and counterfeit banknotes together by means of the transparent adhesive tape to counterfeit banknotes. A banknote thickness detection apparatus is generally used in an existing art to detect whether the banknote surface is stuck to the adhesive tape.

Figure 1:
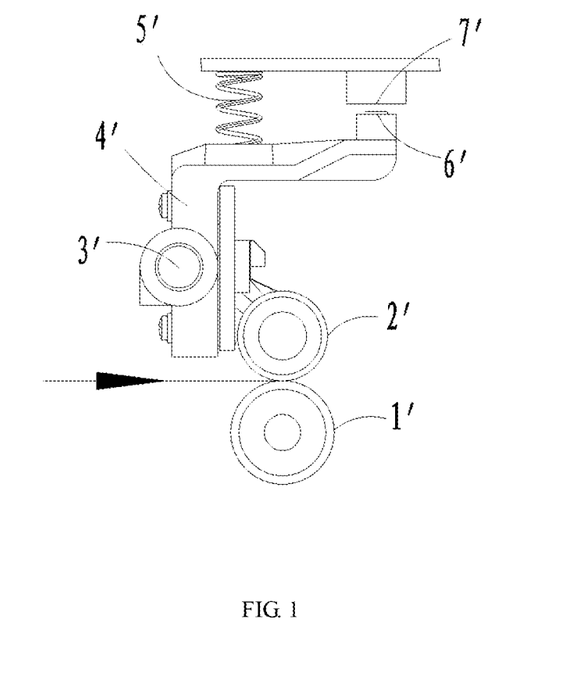
FIG. 1 is a structural view of a banknote thickness detection apparatus in an existing art.

As shown in FIG. 1, the banknote thickness detection apparatus includes a reference roller 1', a plurality of detection assemblies and a supporting shaft 3'. In FIG. 1, the reference roller 1' extends along a width direction of banknotes, and a length is adapted to a width of banknotes. The supporting shaft 3' and the reference roller 1' are oppositely arranged at intervals and parallel mutually. The plurality of detection assemblies are arranged along the supporting shaft 3'. Each detection assembly includes a bracket 4' sleeved with the supporting shaft 3', a thickness measuring roller 2' arranged on the bracket 4', an elastic element 5' configured to press the bracket 4' to enable the detection roller 2' to always press the reference roller 1', a detection part 6' arranged on the bracket 3', and a sensor 7' arranged on a fixing rack, wherein the sensor 7' and the detection part 6' are matched or separated under different conditions. When a banknote pass between the reference roller 1' and the detection roller 2', if the banknote are not stuck to the adhesive tape, a height for lifting the detection roller 2' by banknotes is a thickness of the banknote. At this moment, a distance between the sensor 7' and the detection part 6' is a first distance, and the sensor 7 outputs a first detection signal. When a banknote pass between the reference roller 1' and the detection roller 2', if the banknote are stuck to the adhesive tape, a height for lifting the detection roller 2' by banknotes is a sum of a thickness of the banknote and a thickness of the adhesive tape. At this moment, a distance between the sensor 7' and the detection part 6' is a second distance, and the sensor 7' outputs a second detection signal. It can be judged whether the banknote surface is stuck to the adhesive tape according to the detection signal of the sensor 7'.

Since such apparatus for detecting whether the banknote surface is stuck to the adhesive tape uses a large number of parts and occupies a large space, the apparatus is not beneficial to increase of assembly efficiency and device miniaturization.

SUMMARY

The purpose of embodiments of the present disclosure is to provide an image sensor, so as to reliably detect whether an original (banknote) is stuck to an adhesive tape. Another purpose of embodiments of the present disclosure is to provide a banknote processing apparatus having the above image sensor.

Thus, according to one aspect of embodiments of the present disclosure, an image sensor is provided, including a first photosensitive assembly and a first light source assembly which is configured to irradiate light to an original, and further including a first lens array configured to aggregate light reflected by the original to the first photosensitive assembly, and a light-entering surface of the first lens array is located in a transmission path of reflected light generated due to specular reflection occurred when light emitted from the first light source assembly irradiates on the original.

An optical axis of the above first lens array is configured to be parallel with reflected light which is generated due to specular reflection occurred when light emitted from the first light source assembly irradiates on the original and which reaches the light-entering surface of the first lens array.

The above image sensor may further include a second lens array, which aggregates light penetrating through the original to the first photosensitive assembly.

The above first light source assembly may include a light guiding part including a first light-exiting surface and a second light-exiting surface which are configured in an inclined angle; and a light-entering surface of the first lens array is located in a transmission path of reflected light generated due to specular reflection occurred when light emitted from the first light-exiting surface irradiates on the original.

According to another respect of embodiments of the present disclosure, a banknote processing apparatus is provided, including a first image sensor configured to obtain a first surface image of a banknote, and the first image sensor is the image sensor described above.

The above banknote processing apparatus may further include a second image sensor configured to obtain a second surface image of the banknote; and the second image sensor includes a second photosensitive assembly, a second light source assembly configured to provide light to the banknote, and a second lens array configured to aggregate light reflected by the banknote to the second photosensitive assembly.

The second image sensor may further include a third lens array configured to aggregate light penetrating through the banknote to the second photosensitive assembly.

The above first image sensor may further include a third light source assembly configured to irradiate light to the banknote; and a light-entering surface of the third lens array is located in a transmission path of transmitted light generated after light emitted from a light-exiting surface of the third light source assembly irradiates on the banknote.

The above first light source assembly may include a light guiding part; the light guiding part includes a first light-exiting surface and a second light-exiting surface which are configured in an inclined angle; a light-entering surface of the first lens array is located in a transmission path of reflected light generated due to specular reflection occurred when light emitted from the first light-exiting surface irradiates on the banknote; and a light-entering surface of the third lens array is located in a transmission path of transmitted light generated after light emitted from the second light-exiting surface irradiates on the banknote.

The above banknote processing apparatus may further include a first pressing roller in abutting fit with the first image sensor, and a brush layer is distributed on a periphery of the first pressing roller.

In the image sensor provided in embodiments of the present disclosure, a light-entering surface of the lens array is located in a transmission path of reflected light generated due to specular reflection occurred when light emitted from the light source assembly irradiates on the original. A grayscale value of an image generated by that incident light is reflected to the lens array after irradiating on the original in a position of sticking the adhesive tape is different from a grayscale value of an image generated by that the incident light is reflected to the lens array after irradiating on the original in a position of not sticking the adhesive tape. Therefore, it can be judged whether a original surface is stuck to the adhesive tape. Further, the optical axis of the lens array is configured to be parallel with the reflected light generated by specular reflection of the incident light, so that the grayscale value of the image generated by that the incident light is reflected to the lens array after irradiating the adhesive tape is larger, to make a detection result more accurate.

In the banknote processing apparatus provided in embodiments of the present disclosure, the pressing roller with the brush layer is configured to press a detection banknote surface of the banknote on a light transmission plate of the image sensor for detection. In this way, the banknote surface is flat; a light reflection effect of the adhesive tape on the banknote surface is enhanced; a fluctuation scope of depth of field is decreased; and meanwhile, the lens array is further configured to aggregate the light to the first photosensitive assembly, thereby increasing sensitivity of the photosensitive assembly to light reflection of the adhesive tape.

Compared with a method in an existing art that a thickness of the banknote is detected to detect whether the banknote surface is stuck to the adhesive tape, the banknote processing apparatus provided in embodiments of the present disclosure judges whether the banknote surface is stuck to the adhesive tape according to different image grayscale values generated by the image sensor, so the present disclosure has a small number of parts, a compact structure and a small occupied space, facilitates increase of assembly efficiency and benefits device miniaturization.

Besides purposes, features and advantages described above, embodiments of the present disclosure further have other purposes, features and advantages. Embodiments of the present disclosure are further described in detail below with reference to drawings.

BRIEF DESCRIPTION OF DRAWINGS

Drawings of the description that form part of the present application are used for providing a further understanding of the present disclosure. Illustrative embodiments of the present disclosure and descriptions thereof are used for explaining the present disclosure, rather than forming an improper limitation to the present disclosure. In the drawings.

A LIST OF REFERENCE NUMERALS

| | |
|---|---|
| 100. Paper guiding mechanism; | 200. Paper feeding mechanism; |
| 300. Banknote information acquisition mechanism; | |
| 310. Image acquisition mechanism; | |
| 320. Magnetic information acquisition mechanism; | 1. First frame; |
| 2. First light source assembly; | 81. First lens array; |
| 4. First photosensitive assembly; | 5. First light transmission plate; |
| 6. Conveying roller group; | 40. Impeller; |
| 51. First reversing part; | 52. Second reversing part; |
| 311. First image sensor; | 312. First pressing roller; |
| 321. Magnetic head; | 322. Second pressing roller; |
| 313. Second image sensor; | 314. Third pressing roller; |
| 21. First light-exiting surface; | 22. Second light-exiting surface; |
| 31. Light-entering surface of first lens array; | 71. Second frame; |
| 72. Second light source assembly; | 73. Second lens array; |
| 74. Second photosensitive assembly; | 75. Third lens array; |
| 76. Second light transmission plate; | 721. Second light-exiting surface; |
| 731. Light-entering surface of second lens array; | |
| 751. Light-entering surface of third lens array; | 8. Third light source assembly; |
| 81. Light-exiting surface of third light source assembly; | |
| P. Main passage; | S0. Banknote inlet; |
| S3. Banknote-returning port; | S1. First banknote outlet; |
| S2. Second banknote outlet; | P1. First auxiliary passage; |
| P2. Second auxiliary passage. | |

DETAILED DESCRIPTION

It should be noted that embodiments in the present application and features in embodiments can be combined with each other without conflict. The present disclosure will be described in detail below with reference to drawings and in combination with embodiments.

Figure 2:
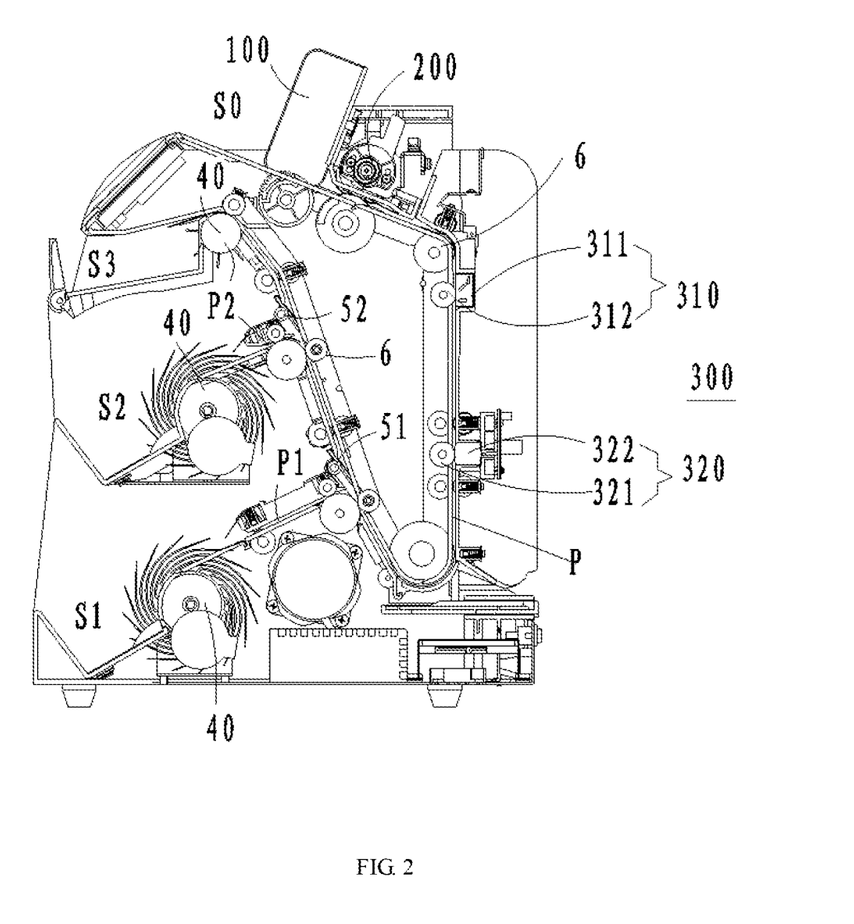
FIG. 2 is a structural view of a banknote processing apparatus according to an embodiment of the present disclosure.

FIG. 2 is a structural view of a banknote processing apparatus using an image sensor provided in embodiments of the present disclosure. In the present embodiment, the banknote processing apparatus is a banknote sorter. As shown in FIG. 2, the banknote sorter is provided with a banknote inlet S0, a banknote-returning port S3 and at least one banknote outlet which are connected to outside. The banknote sorter includes a main passage P, at least one auxiliary passage, a paper guiding mechanism 100, a banknote feeding mechanism 200, a banknote information acquisition mechanism 300, a conveying mechanism, a reversing mechanism and a driving mechanism (not shown in the figure).

The banknote inlet S0 is located at a start end of the main passage P, and the banknote inlet S0 is configured to stack to-be-treated banknotes. The paper guiding mechanism 100 is arranged at the banknote inlet S0, and is configured to limit positions of banknotes stacked at the banknote inlet S0 along a width direction of the banknotes. The paper feeding mechanism 200 is configured to feed banknotes stacked at the banknote inlet S0 one by one to the banknote information acquisition mechanism 300.

Each banknote outlet is connected with the main passage P through one auxiliary passage to accommodate identified normal banknotes. The banknote-returning port S3 is located at an end of the main passage P to accommodate identified abnormal banknotes, such as counterfeit banknotes, worn banknotes, adhesive-tape-spliced banknotes and the like. The conveying mechanism is configured to drive banknotes to move along the main passage P or the auxiliary passage. The conveying mechanism includes a plurality of conveying roller groups 6 and a plurality of impellers 40, wherein the plurality of conveying roller groups 6 are arranged on the main passage P and each auxiliary passage to drive banknotes to move in the main passage P or the auxiliary passage. Number of impellers 40 of the conveying mechanism is equal to a total number of the banknote outlets and the banknote-returning port S3, wherein one impeller 40 is arranged between each banknote outlet and a corresponding auxiliary passage to feed banknotes in the auxiliary passage into the banknote outlets one by one. One impeller 40 is arranged between the banknote-returning port S3 and the main passage P to feed banknotes in the main passage P into the banknote-returning port S3.

In the present embodiment, the banknote sorter includes a banknote inlet S0, two banknote outlets (i.e., a first banknote outlet S1 and a second banknote outlet S2), two auxiliary passages (i.e., a first auxiliary passage P1 and a second auxiliary passage P2) and a banknote-returning port S3. The conveying mechanism includes three impellers 40, wherein the first banknote outlet S1 is connected with the main passage P through the first auxiliary passage P1 to accommodate first kind of identified normal banknotes, such as Renminbi in 100-yuan denomination; and the second banknote outlet S2 is connected with the main passage P through the second auxiliary passage P2 to accommodate second kind of identified normal banknotes, such as Renminbi in 50-yuan denomination. Three impellers 40 of the conveying mechanism are respectively arranged between the first auxiliary passage P1 and the first banknote outlet S1, between the second auxiliary passage P2 and the second banknote outlet S2, and between the main passage P and the banknote-returning port S3. The reversing mechanism includes a first reversing part 51, a second reversing part 52, a first driving part and a second driving part (not shown in the figure). The first reversing part 51 is arranged at an intersection of the main passage P and the first auxiliary passage P1, and the second reversing part 52 is arranged at an intersection of the main passage P and the second auxiliary passage P2. The first driving part and the second driving part may be cams or electromagnets and the like. The first driving part is connected with the first reversing part 51. Driven by the first driving part, the first reversing part 51 can move to a first position or a second position. When the first reversing part 51 is located in the first position, the main passage P is connected with the first auxiliary passage P1 and banknotes located in the main passage P are fed into the first auxiliary passage P1 through guidance of the first reversing part 51. When the first driving part drives the first reversing part 51 to move to the second position, a path between the main passage P and the first auxiliary passage P1 is disconnected, and banknotes can only continue to move downstream along the main passage P. The second driving part is connected with the second reversing part 52. Driven by the second driving part, the second reversing part 52 can move to a first position or a second position. When the second reversing part 52 is located in the first position, the main passage P is connected with the second auxiliary passage P2 and banknotes located in the main passage P are fed into the second auxiliary passage P2 through guidance of the second reversing part 52. When the second driving part drives the second reversing part 52 to move to the second position, a path between the main passage P and the second auxiliary passage P2 is disconnected, the main passage P is connected with the banknote-returning port S3 and banknotes in the main passage P are fed into the banknote-returning port S3.

The banknote information acquisition mechanism 300 is arranged on the main passage P and includes an image acquisition mechanism 310 and a magnetic information acquisition mechanism 320. The image acquisition mechanism 310 is configured to acquire image information on a banknote surface. The image acquisition mechanism 310 includes a first image sensor 311 and a first pressing roller 312 which are arranged on both sides of the main passage P and are tangentially arranged. The magnetic information acquisition mechanism 320 is configured to acquire magnetic information on a banknote. The magnetic information acquisition mechanism 320 includes a magnetic head 321 and a second pressing roller 322 which are arranged on both sides of the main passage P and are oppositely arranged. When a banknote pass between the magnetic head 321 and the second pressing roller 322, the magnetic head 321 reads the magnetic information on the banknote surface. A controller of the banknote sorter judges whether the banknote surface is stuck to an adhesive tape, as well as authenticity of banknotes, denomination and other information according to the image information and the magnetic information acquired by the image acquisition mechanism 310 and the magnetic information acquisition mechanism 320.

Figure 3:
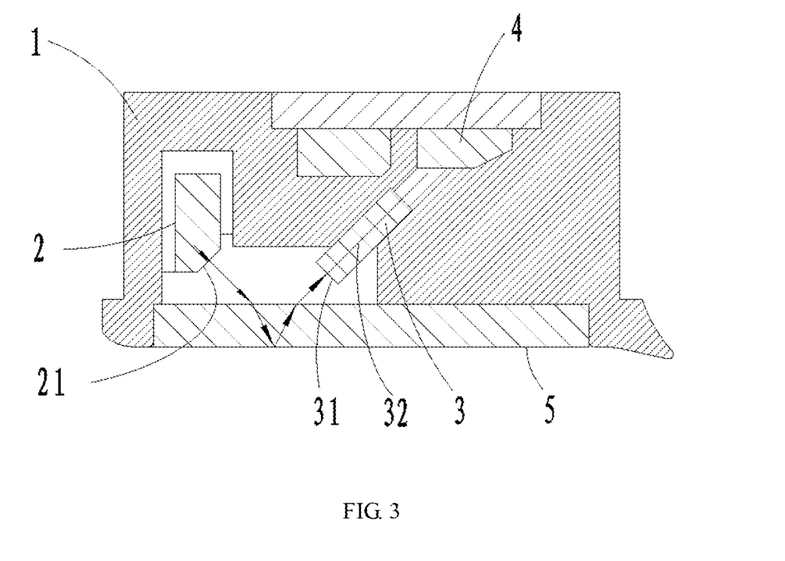
FIG. 3 is a structure sectional view of an image sensor according to an embodiment of the present disclosure.
Figure 4:
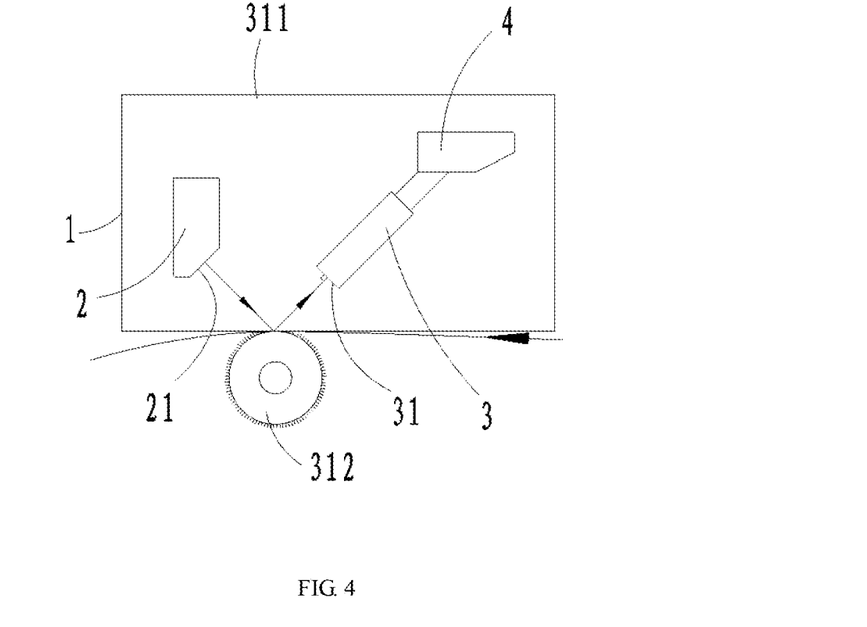
FIG. 4 is a structure sectional view of a first detection mechanism of a banknote processing apparatus according to an embodiment of the present disclosure.

FIG. 3 is a structure sectional view of an image sensor according to an embodiment of the present disclosure. FIG. 4 is a structure sectional view of an image acquisition mechanism of a banknote processing apparatus according to an embodiment of the present disclosure. As shown in FIG. 3 and FIG. 4, the first image sensor 311 in the image acquisition mechanism 310 includes a first frame 1, a first light source assembly 2, a first lens array 3, a first photosensitive assembly 4 and a first light transmission plate 5, wherein the first light transmission plate 5 encapsulates the first light source assembly 2, the first lens array 3 and the first photosensitive assembly 4 into a chamber on the first frame 1.

A light-entering surface 31 of the first lens array 3 and the first light transmission plate 5 are configured in an inclined angle. The light-entering surface 31 of the first lens array 3 is located in a transmission path of reflected light generated due to specular reflection occurred when light emitted from a first light-exiting surface 21 of the first light source assembly 2 irradiates on an original. When the first light source assembly 2 emits incident light to irradiate on the original from the first light-exiting surface 21, if the incident light penetrates through the first light transmission plate 5 to irradiate on the original to produce specular reflection, reflected light generated by specular reflection irradiates on the light-entering surface 31 of the first lens array 3 after penetrating through the first light transmission plate 5; the first lens array 3 aggregates received reflected light to the first photosensitive assembly 4; and the first photosensitive assembly 4 outputs a corresponding signal according to the received light, thereby forming an image of the original. A inclined angle between the optical axis 32 of the first lens array 3 and the first light transmission plate 5 may meets following conditions: reflected light, generated due to specular reflection when light emitted from the first light-exiting surface 21 and perpendicular to the first light-exiting surface 21 irradiates on the original, vertically irradiates on the light-entering surface 31 of the first lens array 3, i.e., the reflected light is parallel to the optical axis 32. At this moment, An angle and a position of the optical axis 32 are obtained through calculation according to an angle and a position of the first light-exiting surface 21 of the first light source assembly 2, a reflection principle, a refraction principle and an angular relationship between the reflected light and the light-entering surface 31 of the first lens array 3. In the present embodiment, an inclined angle between the optical axis 32 and the first light transmission plate 5 is 45°; an inclined angle between the first light-exiting surface 21 and the first light transmission plate 5 is 45°; and the reflected light, generated due to specular reflection when the incident light emitted from the first light-exiting surface 21 and perpendicular to the first light-exiting surface 21 irradiates on the original, vertically irradiates on the light-entering surface 31 of the first lens array 3.

The first pressing roller 312 and the first light transmission plate 5 of the first image sensor 311 are tangentially arranged. Light emitted from the first light-exiting surface 21 of the first light source assembly 2 is reflected to the light-entering surface 31 of the first lens array 3 after irradiating on an original surface in a tangential position of the first pressing roller 312 and the first light transmission plate 5 through the first light transmission plate 5. The first pressing roller 312 may be a brush roller, and a brush layer is distributed at a periphery of the brush roller. The brush roller is tangential to the first light transmission plate 5 of the first image sensor 311. First of the first pressing roller 312 on both sides of the tangential position press the original, so that a contact area between the original and the first light transmission plate 5 is larger to enable the first image sensor 311 to acquire a clearer image.

In other embodiments, another flexible banknote pressing layer replaces the brush layer on the roller surface of the first pressing roller 312, so that parts positioned on both sides of the tangential position on the first pressing roller 312 press the original to make a contact area between the original and the first light transmission plate 5 larger to enable the first image sensor 311 to acquire a clearer image.

Figure 5:
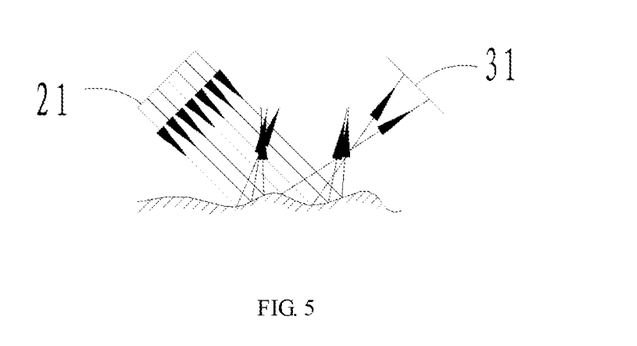
FIG. 5 is a view of an angle between incident light and reflected light in cooperation of an image sensor and an original according to an embodiment of the present disclosure.
Figure 6:
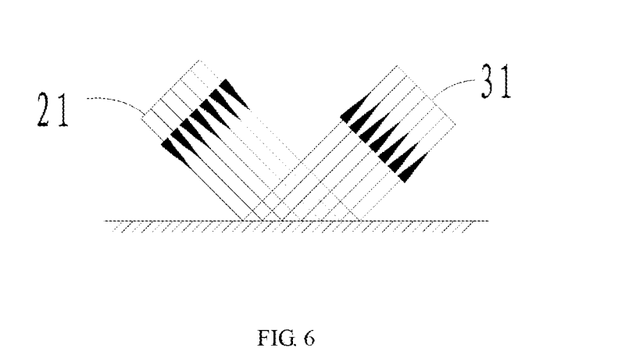
FIG. 6 is a view of an angle between incident light and reflected light in cooperation of an image sensor and an adhesive tape according to an embodiment of the present disclosure.

FIG. 5 is a view of an angle between incident light and reflected light in cooperation of an image sensor and an original according to an embodiment of the present disclosure. FIG. 6 is a view of an angle between incident light and reflected light in cooperation of an image sensor and an adhesive tape according to an embodiment of the present disclosure. A working principle of the image acquisition mechanism 310 is introduced below in combination with FIG. 4 to FIG. 6.

As shown in FIG. 4, when the image sensor detects the original, incident light emitted from the first light-exiting surface 21 of the first light source assembly 2 produces reflection after irradiating on the original. If the original surface is not stuck to a adhesive tape, as shown in FIG. 5, reflection angles of light reflected back by the incident light after irradiating on the original surface are different and then diffuse reflection is formed since the original surface is uneven microcosmically. Only part of the reflected light irradiates on the light-entering surface 31 of the first lens array 3, and the first lens array 3 aggregates this part of the light to the first photosensitive assembly 4; the first photosensitive assembly 4 outputs a signal based on the received light; and at this moment, an original image is generated according to the signal outputted by the first photosensitive assembly 4. If the original surface is stuck to the adhesive tape, as shown in FIG. 6, reflection angles of the light reflected by the incident light after irradiating on the surface of the adhesive tape are identical and then specular reflection is formed since a surface of the adhesive tape is smooth. Most of reflected light irradiates on the light-entering surface 31 of the first lens array 3, the first lens array 3 aggregates this part of the light to the first photosensitive assembly 4, the first photosensitive assembly 4 outputs a signal based on the received light, and at this moment, the original image is generated according to the signal outputted by the first photosensitive assembly 4. Since intensity of the light received by the light-entering surface 31 of the first lens array 3 when the original surface is not stuck to the adhesive tape is less than intensity of the light received by the light-entering surface 31 of the first lens array 3 when the original surface is stuck to the adhesive tape, grayscale values of original images formed in above two cases are different; and the controller judges whether the original surface is stuck to the adhesive tape according to a detected grayscale difference between the original images.

It should be noted that in embodiments of the present disclosure, by using the first pressing roller 312 to press the original on the light transmission plate, the surface of the adhesive tape is smooth and flat so that intensity of the light reflected by the surface of the adhesive tape is increased.

When specular reflection is produced on the original surface, the reflected light vertically irradiates on the light-entering surface 31 of the first lens array 3. Compared with a condition that the reflected light irradiates on the light-entering surface 31 of the first lens array 3 in an inclined angle, luminous flux of light vertically irradiated on the light-entering surface 31 of the first lens array 3 is greater than luminous flux of light irradiated on the light-entering surface 31 of the first lens array 3 in the inclined angle. Therefore, after the first lens array 3 aggregates the reflected light to the first photosensitive assembly 4, the generated image is brighter in grayscale which facilitate the controller to judge whether the original surface is stuck to the adhesive tape.

In the image sensor provided in the present disclosure, the light-entering surface of the lens array is located in a transmission path of reflected light generated due to specular reflection occurred when the light emitted from the light source assembly irradiates on the original. A grayscale value of an image generated in a case that incident light is reflected to the lens array after irradiating on the original in a position of sticking the adhesive tape is different from a grayscale value of an image generated in a case that the incident light is reflected to the lens array after irradiating on the original in a position of not sticking the adhesive tape. Therefore, it can be judged whether an original surface is stuck to the adhesive tape based on this. Further, an optical axis of the lens array is configured to be parallel with the reflected light generated by specular reflection of the incident light, so that there is a greater difference between the grayscale value of the image generated in a case that incident light is reflected to the lens array after irradiating on the adhesive tape and the grayscale value of the image generated in a case that the incident light is reflected to the lens array after irradiating on the original without the adhesive tape, so that a detection result is more accurate.

Compared with a method in an existing art that a thickness of the banknote is detected to detect whether the banknote surface is stuck to the adhesive tape, the banknote processing apparatus provided in embodiments of the present disclosure judges whether the banknote surface is stuck to the adhesive tape according to different image grayscale values generated by the image sensor, so the present disclosure has a small number of parts, a compact structure and a small occupied space, facilitates increase of assembly efficiency and benefits device miniaturization.

Figure 7:
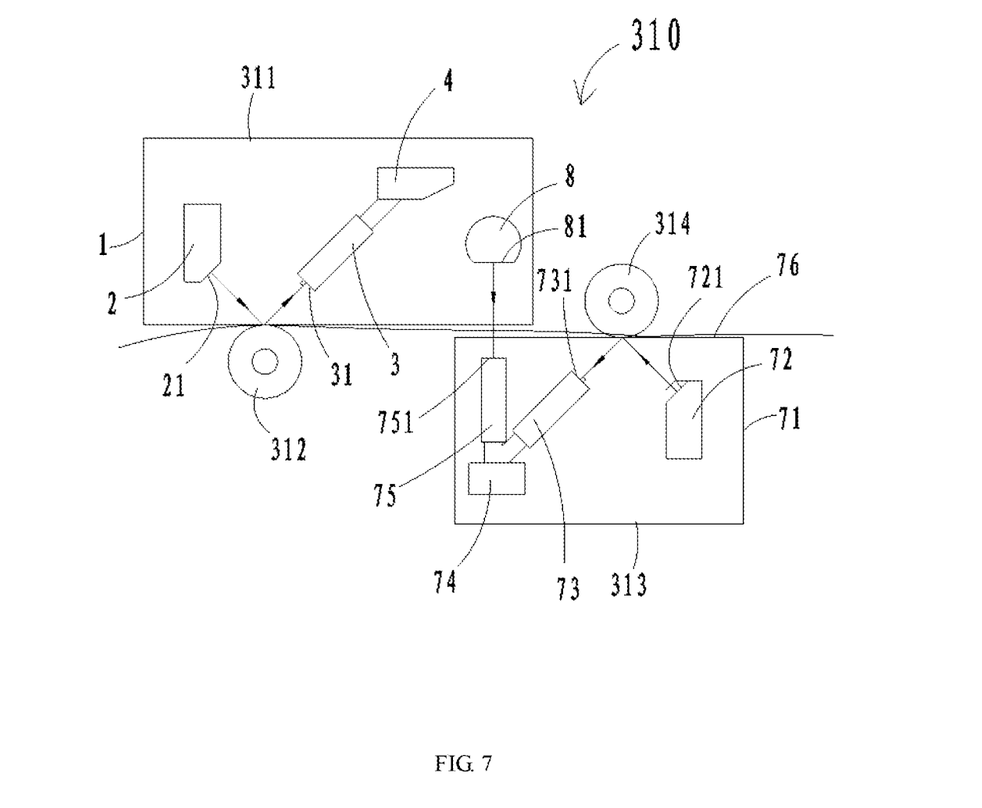
FIG. 7 is a structural view of an image acquisition mechanism of a banknote processing apparatus according to another embodiment of the present disclosure.

FIG. 7 is a structural view of an image acquisition mechanism of a banknote processing apparatus according to another embodiment of the present disclosure. As shown in FIG. 7, a difference between the present embodiment and corresponding embodiments in FIG. 3 and FIG. 4 is that the image acquisition mechanism 310 in the present embodiment further includes a second image sensor 313 and a third pressing roller 314 which are respectively located on both sides of the main passage P and are tangentially arranged, wherein the second image sensor 313 and the first pressing roller 312 are located on a same side of the main passage P, and the third pressing roller 314 and the first image sensor 311 are located on a same side of the main passage P, wherein the first image sensor 311 is configured to acquire image information on a first surface of the banknote and the second image sensor 313 is configured to acquire image information on a second surface of the banknote.

The second image sensor 313 includes a second frame 71, a second light source assembly 72, a second lens array 73, a second photosensitive assembly 74, a third lens array 75 and a second light transmission plate 76. The second light transmission plate 76 encapsulates the second light source assembly 72, the second lens array 73, the third lens array 75 and the second photosensitive assembly 74 into a chamber on the second frame 71. The second lens array 73 and the third lens array 75 respectively aggregate received light to the second photosensitive assembly 74; the light-exiting surface 721 of the second light source assembly 72 emits incident light; and specular reflection is generated after the light irradiates on the original through the second light transmission plate 76. After passing through the second light transmission plate 76, the reflected light vertically irradiates on the light-entering surface 731 of the second lens array 73. The second lens array 73 aggregates the reflected light to the second photosensitive assembly 74, and the second photosensitive assembly 74 outputs a corresponding signal according to the received light, so that reflected images of the original may be formed based on this. An arrangement form of the light-entering surface 731 of the second lens array 73 is as same as an arrangement form of the light-entering surface 31 of the first lens array 3, and is not repeated herein. The light-entering surface 751 of the third lens array 75 is oppositely arranged and parallel to the light-exiting surface 81 of the third light source assembly 8 of the first image sensor 311. The light emitted from the light-exiting surface 81 of the third light source assembly 8 irradiates on the light-entering surface 751 of the third lens array 75 after penetrating through the first light transmission plate 5, banknotes and the second light transmission plate 76. The third lens array 75 aggregates the light to the second photosensitive assembly 74 of the second image sensor 313, the second photosensitive assembly 74 outputs a signal according to the received light, and transmission images of banknotes can be generated according to the signal outputted by the second photosensitive assembly 74. Therefore, the image acquisition mechanism 310 in the banknote processing apparatus provided in the present embodiment not only can acquire image information on a front surface and a back surface of the banknote to detect whether the banknote surface is stuck to the adhesive tape, but also can detect information of the transmission images of banknotes.

Figure 8:
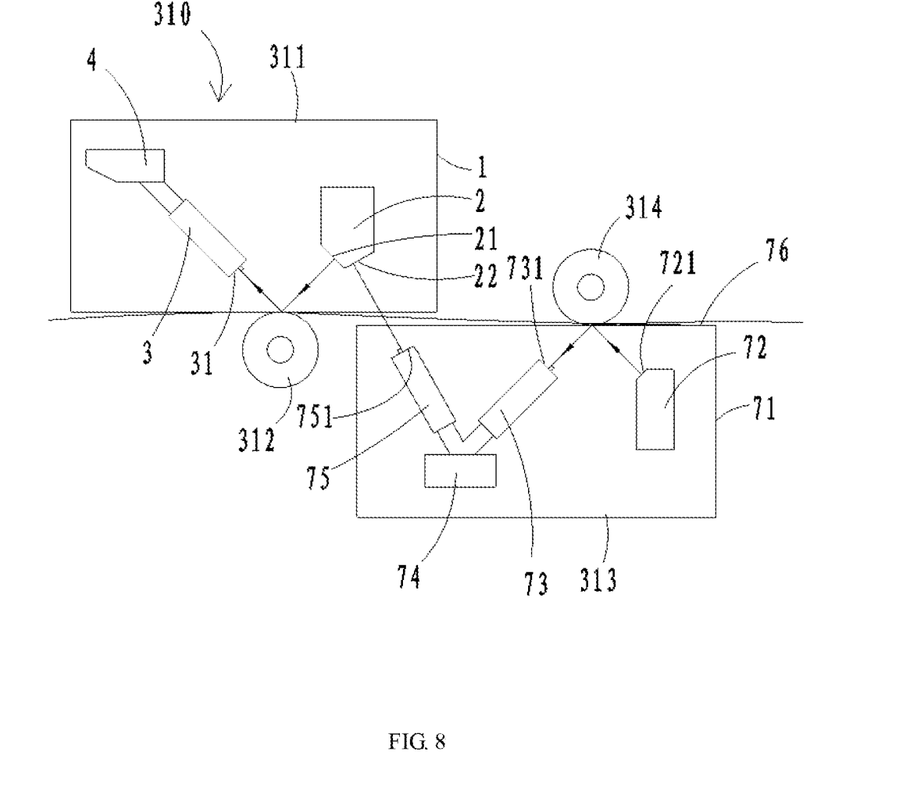
FIG. 8 is a structural view of an image acquisition mechanism of a banknote processing apparatus according to still another embodiment of the present disclosure.

FIG. 8 is a structural view of an image acquisition mechanism of a banknote processing apparatus according to a third embodiment of the present disclosure. As shown in FIG. 8, a difference between the present embodiment and the second embodiment is that in the present embodiment, the first image sensor 311 is not provided with the third light source assembly 8 but a second light-exiting surface 22 is arranged in the first light source assembly 2; the second light-exiting surface 22 and the first light-exiting surface 21 are configured in an inclined angle; and the second light-exiting surface 22 and the light-entering surface 751 of the third lens array 75 of the second image sensor 313 are parallel and opposite. The light emitted from the second light-exiting surface 22 of the first light source assembly 2 of the first image sensor 311 irradiates on the light-entering surface 751 of the third lens array 75 after penetrating through the first light transmission plate 5, banknotes and the second light transmission plate 76. The third lens array 75 aggregates the transmitted light received by the light-entering surface 751 of the third lens array 75 to the second photosensitive assembly 74 of the second image sensor 313. The second photosensitive assembly 74 outputs a signal according to the received light, and can generate a transmission image of the banknote according to the output signal of the second photosensitive assembly 74. Compared with the second embodiment, the present embodiment reduces one light source assembly, and therefore, reduces cost of the image sensor.

The present disclosure further proposes a detection method for spliced banknotes, including following steps: detecting banknotes by using a banknote processing apparatus; acquiring abnormal grayscale points of banknotes corresponding to the adhesive tape according to a detection result; and judging that banknotes are adhesive-tape-spliced banknotes if more than two abnormal grayscale points exist at a surrounding edge of banknotes.

Through the above method, banknotes including the adhesive-tape-spliced banknotes can be simply detected first, thereby increasing check efficiency to facilitate subsequent manual check or device check. It should be noted that the surrounding edge refers to a rectangular annular region away from an edge of the banknote by a predetermined width (such as 10 mm).

In the above method, the above abnormal grayscale points of banknotes corresponding to the adhesive tape can be acquired through a grayscale difference. In an embodiment of the present disclosure, identification of the above abnormal grayscale points of banknotes corresponding to the adhesive tape can be acquired through an artificial neural net subjected to sample training. First, an artificial neural net model is constructed first; then samples are taken for training; and corresponding training samples include various common forms of adhesive-tape-spliced banknotes and non-adhesive-tape-spliced banknotes. The more the banknote samples are, the higher the accuracy is. After training and check of a set number of samples, the samples can be used for detecting the abnormal grayscale points corresponding to the adhesive tape.

The above contents are only embodiments of the present disclosure and are not used for limiting the present disclosure. For those skilled in the art, various changes and modifications can be made to the present disclosure. Any modification, equivalent replacement, improvement and the like made within spirits and principles of the present disclosure shall be included in the protection scope of the present disclosure.

What is claimed is:

1. A banknote processing apparatus, comprising a first image sensor configured to obtain a first surface image of a banknote, wherein the first image sensor comprises a first photosensitive assembly and a first light source assembly which is configured to irradiate light to an original of the banknote, and further comprises a first lens array configured to aggregate light reflected by the original to the first photosensitive assembly, wherein a light-entering surface of the first lens array is located in a transmission path of reflected light generated due to specular reflection occurred when light emitted from the first light source assembly irradiates on the original, wherein the banknote processing apparatus further comprises a second image sensor configured to obtain a second surface image of the banknote; and the second image sensor comprises a second photosensitive assembly, a second light source assembly configured to irradiate light to the banknote, and a second lens array configured to aggregate light reflected by the banknote to the second photosensitive assembly, wherein the second image sensor further comprises a third lens array configured to aggregate light penetrating through the banknote to the second photosensitive assembly, and wherein the first image sensor further comprises a third light source assembly configured to irradiate light to the banknote; and a light-entering surface of the third lens array is located in a transmission path of transmitted light generated after light emitted from a light-exiting surface of the third light source assembly irradiates on the banknote.

* * * * *